(12) United States Patent
Tsubouchi et al.

(10) Patent No.: US 7,322,039 B2
(45) Date of Patent: Jan. 22, 2008

(54) DIGITAL AND ANALOG BROADCASTING RECEIVER

(75) Inventors: Akinori Tsubouchi, Hyogo (JP); Takahiro Miyakoshi, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1147 days.

(21) Appl. No.: 09/994,686

(22) Filed: Nov. 28, 2001

(65) Prior Publication Data
US 2002/0067437 A1  Jun. 6, 2002

(30) Foreign Application Priority Data
Dec. 1, 2000 (JP) ............................. 2000-366510

(51) Int. Cl.
*H04N 7/16* (2006.01)
(52) U.S. Cl. ...................... 725/151; 348/731; 348/732; 455/168.1; 455/186.1
(58) Field of Classification Search ................ 348/732; 725/68, 151; 455/185.1, 168.1
See application file for complete search history.

(56) References Cited

U.S. PATENT DOCUMENTS

| | | | | |
|---|---|---|---|---|
| 5,287,532 A | * | 2/1994 | Hunt | 712/10 |
| 5,905,864 A | * | 5/1999 | Terasima et al. | 725/112 |
| 6,622,307 B1 | * | 9/2003 | Ho | 725/120 |
| 6,721,018 B1 | * | 4/2004 | Shintani et al. | 348/731 |

FOREIGN PATENT DOCUMENTS

| | | | |
|---|---|---|---|
| JP | 04-101508 | | 4/1992 |
| JP | 06-085616 | | 3/1994 |
| JP | 09-055897 | | 2/1997 |
| JP | 09-116821 | | 5/1997 |
| JP | 11032267 A | * | 2/1999 |
| JP | 11-261906 | | 9/1999 |
| JP | 2002-158939 | | 5/2002 |

* cited by examiner

*Primary Examiner*—Andrew Y. Koenig
*Assistant Examiner*—Sumaiya A. Chowdhury
(74) *Attorney, Agent, or Firm*—Westerman, Hattori, Daniels & Adrian, LLP.

(57) ABSTRACT

A digital and analog broadcasting receiver comprises a main CPU for mainly controlling a digital broadcasting processing system and a sub-CPU for mainly performing processing such as input processing of a remote control signal by a remote control transmitter, and is so configured that the main CPU performs existent station channel search processing on the side of a terrestrial wave digital tuner, the sub-CPU performs existent station channel search processing on the side of a terrestrial wave analog tuner, and channel searches by the main CPU and the sub-CPU are concurrently conducted.

6 Claims, 3 Drawing Sheets

DIGITAL AND ANALOG BROADCASTING RECEIVER

BACKGROUND OF THE INVENTION

Field of the Invention

The present invention relates to a digital and analog broadcasting receiver capable of receiving both digital broadcasting and analog broadcasting. A digital broadcasting receiver for receiving digital broadcasting using a satellite or a terrestrial wave selects an arbitrary broadcasting wave out of a plurality of broadcasting waves which are received through a dedicated antenna or a terrestrial wave antenna by a tuner, selects an arbitrary channel out of a plurality of channels included in the selected broadcasting wave by demultiplexing processing, takes out a digital signal on the selected channel, and decodes the digital signal, to output a video/audio signal.

A digital and analog broadcasting receiver comprising an analog tuner for receiving conventional analog broadcasting, together with such a digital tuner for receiving digital television broadcasting can be configured. In existent station channel search processing in the digital and analog broadcasting receiver, search processing on the side of the digital tuner and search processing on the side of the analog tuner are successively performed. That is, as shown in a flow chart of FIG. 3, a search start channel is set in the digital tuner (step S1), the digital tuner is caused to perform a channel selection operation at the lowest frequency, for example (step S2), it is judged whether or not a station exists on a channel (step S3), and channel information storage processing is performed when it is judged that a station exists on a channel (step S4). It is judged whether or not the set channel is a search end channel (frequency) (step S5), and the subsequent frequency is set if the set channel is not a search end channel (step S6), after which the program is returned to the step S2, to repeat a series of processing, described above.

When the existent station channel search processing for the digital broadcasting is terminated, a search start channel is then set in the analog tuner (step S7), the analog tuner is caused to perform a channel selection operation at the lowest frequency, for example (step S8), it is judged whether or not a station exists on a channel (step S9), and channel information storage processing is performed when it is judged that a station exists on a channel (step S10). It is judged whether or not the set channel is a search end channel (frequency) (step S11), and the subsequent frequency is set if the set channel is not a search end channel (step S12), after which the program is returned to the step S8, to repeat a series of processing, described above. When the existent station channel search processing for the analog broadcasting is terminated, the search is terminated.

In the conventional digital and analog broadcasting receiver, the existent station channel search processing for the analog broadcasting is performed after the existent station channel search processing for the digital broadcasting is terminated, as described above. Accordingly, a total time in the existent station channel search processing is lengthened.

The present invention has been made in view of the above-mentioned circumstances and has for its object to provide a digital and analog broadcasting receiver capable of shortening a total time in existent station channel search processing for analog broadcasting and digital broadcasting.

SUMMARY OF THE INVENTION

In order to solve the above-mentioned problem, in a digital and analog broadcasting receiver comprising both a digital tuner for receiving digital broadcasting and an analog tuner for receiving analog broadcasting, a digital and analog broadcasting receiver according to the present invention comprises a first CPU; and a second CPU, and is so configured that the first CPU is in charge of existent station channel search processing on the side of the digital tuner, the second CPU is in charge of existent station channel search processing on the side of the analog tuner, and channel searches by the first CPU and the second CPU are concurrently conducted.

In the above-mentioned configuration, the existent station channel search processing on the side of the digital tuner and the existent station channel search processing on the side of the analog tuner are concurrently performed, thereby making it possible to shorten a total time in the existent station channel search processing for the analog broadcasting and the digital broadcasting.

When the existent station channel search is started, the first CPU may instruct the second CPU to start the existent station channel search and perform the existent station channel search processing on the side of the digital tuner, and the second CPU may perform the existent station channel search processing on the side of the analog tuner upon receipt of the instruction to start the search from the first CPU. Further, the second CPU may be a CPU for inputting a signal based on a key operation by a user and operating.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
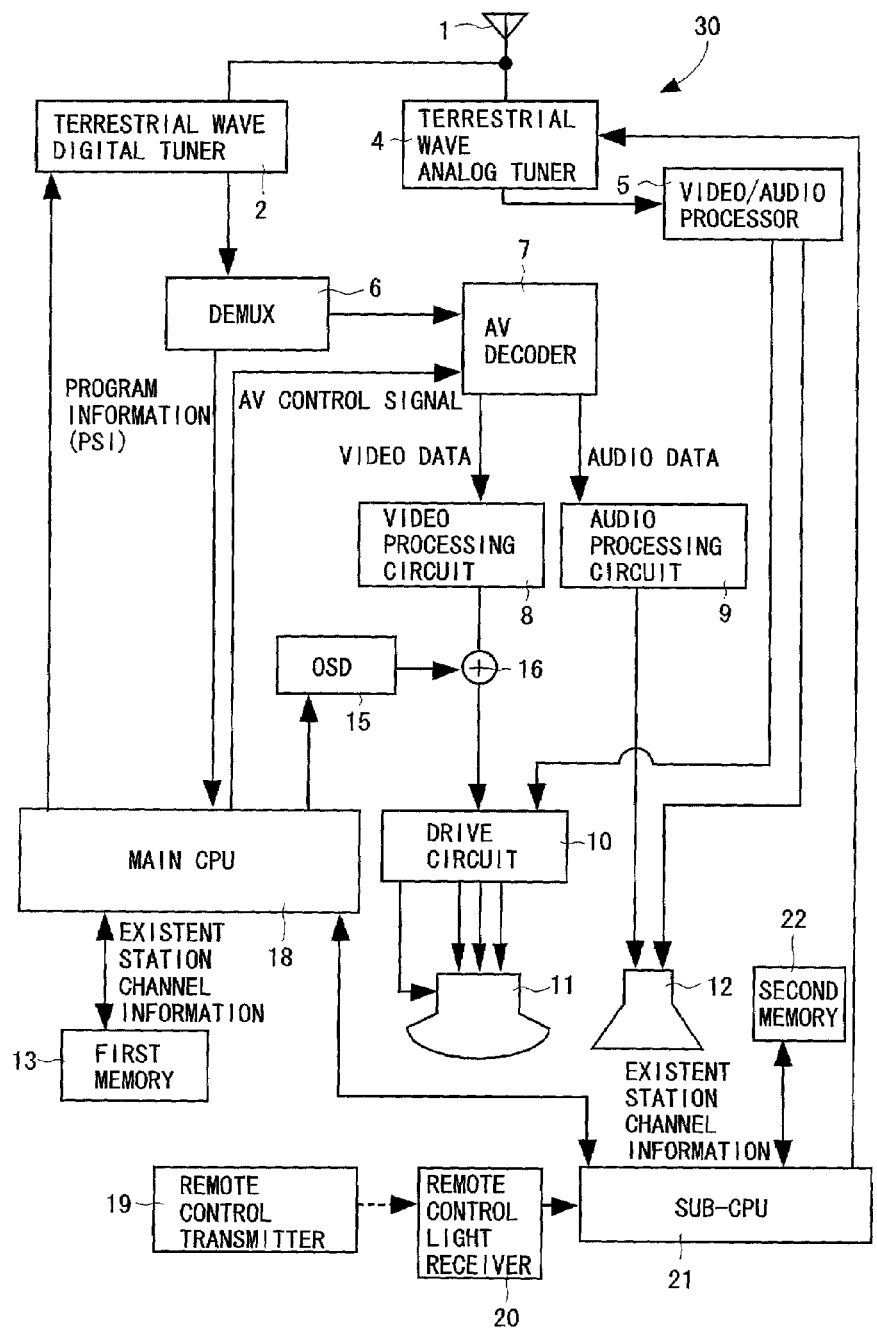
FIG. 1 is a block diagram showing a broadcasting receiver according to the present embodiment by which a user can arbitrarily view terrestrial wave digital broadcasting and terrestrial wave analog broadcasting.
Figure 2:
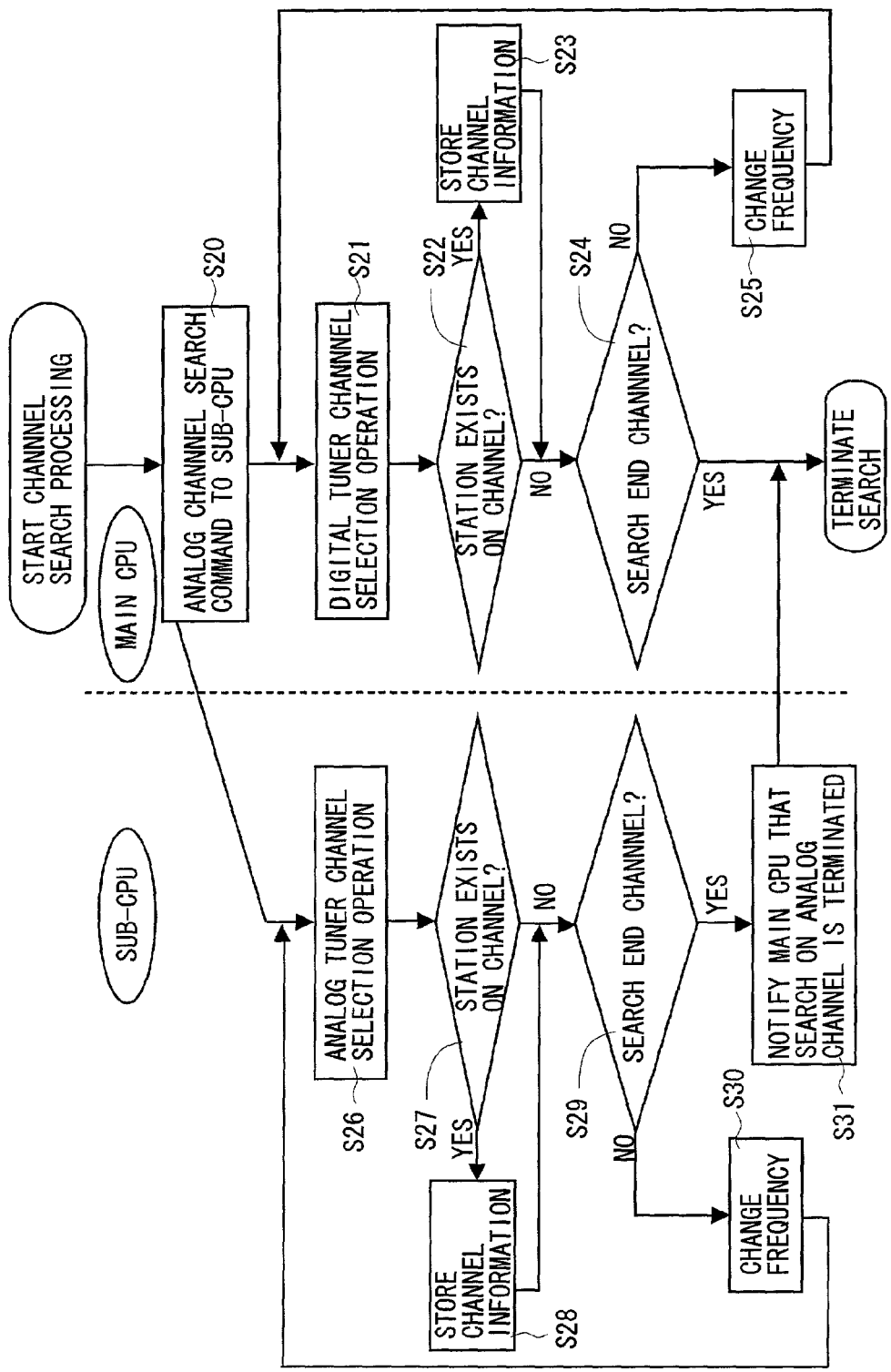
FIG. 2 is a flow chart showing the contents of existent station channel search processing.
Figure 3:
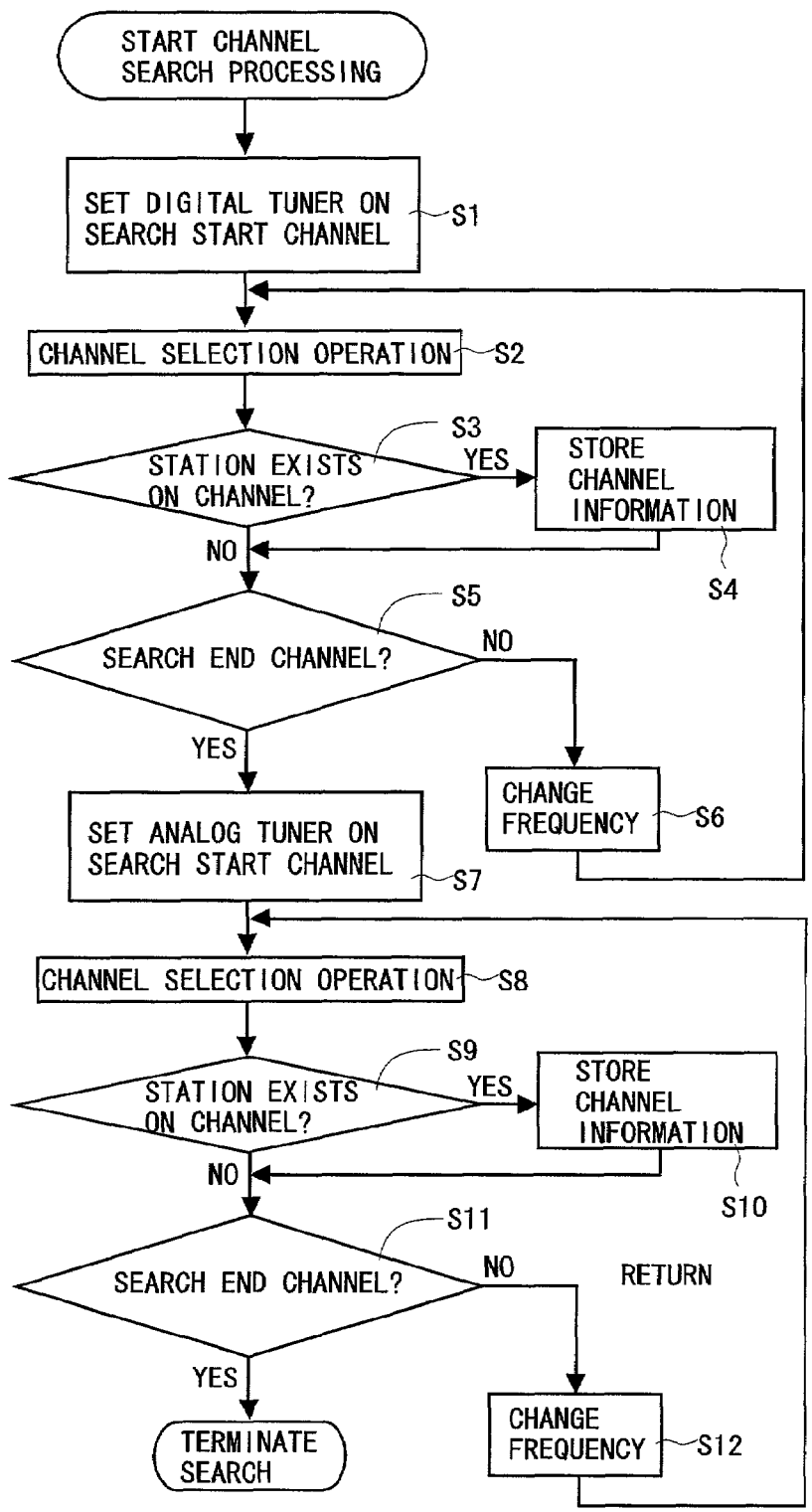
FIG. 3 is a flow chart showing the contents of conventional existent station channel search processing.

An embodiment of the present invention will be described on the basis of FIGS. 1 and 2. A case where a user views terrestrial wave digital broadcasting and terrestrial wave analog broadcasting is illustrated herein.

A terrestrial wave antenna 1 receives a terrestrial broadcasting wave, and feeds a receiving signal to a terrestrial wave digital tuner 2 and a terrestrial wave analog tuner 4. Each of the tuners comprises a channel selection processing circuit, a mixer, and so forth. The mixer mixes a signal on a desired channel and a local oscillation signal, to generate a signal having an intermediate frequency. A circuit for generating the local oscillation signal comprises a variable capacity diode whose capacity varies by an applied voltage, for example, and generates a local oscillation signal which is varied in correspondence with the signal on the desired channel such that the signal having a predetermined intermediate frequency is outputted from the mixer. The channel selection processing circuit receives data representing a voltage (a tuning voltage) corresponding to each channel from a first memory 13 and a second memory 22, changes the data into an analog signal (voltage) by a digital-to-analog (D/A) converter (not shown), and feeds the analog signal into the variable capacity diode.

The terrestrial wave digital tuner 2 takes, out of high-frequency digital modulation signals including video/audio data, the digital modulation signal having a particular frequency by the above-mentioned channel selection processing. Further, the terrestrial wave digital tuner 2 comprises an inverse interleave circuit, an error correcting circuit, a demodulation circuit, and so forth, thereby demodulating the selected digital modulation signal to output a transport stream.

A demultiplexer (DEMUX) 6 separates the transport stream received from the terrestrial wave digital tuner 2 into a video stream and an audio stream based on MPEG2 (Moving Picture Experts Group2) and PSI/SI (Program Specific Information/Service Information). The demultiplexer 6 feeds the video stream and the audio stream to an AV decoder 7, and feeds service information included in the PSI/SI to a main CPU 18.

As described in the foregoing, a plurality of channels are multiplexed on the transport stream. Processing for selecting any of the channels can be performed by taking out from the PSI/SI data indicating which packet ID in the transport stream is used to multiplex the arbitrary channel.

The AV decoder 7 comprises a video decoder for decoding the video stream and an audio decoder for decoding the audio stream. The video decoder decodes an inputted variable length code to find a quantization factor and a motion vector, to carry out inverse DCT (Discrete Cosine Transformation) and motion compensation control based on the motion vector. The audio decoder decodes a coded signal which has been inputted, to generate audio data. The video data generated by the decoding is outputted to a video processing circuit 8, and the audio data is outputted to an audio processing circuit 9.

The video processing circuit 8 receives the video data from the AV decoder 7, and subjects the video data to digital-to-analog (D/A) conversion, to generate a video signal. The audio signal processing circuit 9 receives the audio data outputted from the AV decoder 7, and subjects the audio data to D/A conversion, to generate an analog audio signal.

A video/audio processor 5 demodulates the receiving signal fed from the terrestrial wave analog tuner 4, to generate a video signal and an audio signal.

An OSD (On Screen Display) circuit 15 outputs to an adder 16 bit map data based on character information whose output instruction is issued from the main CPU 18. The adder 16 incorporates a video signal based on the bit map data into the received video signal, and feeds the video signal to a drive circuit 10.

A television picture tube 11 displays video by video signals (R, G, and B signals and vertical and horizontal synchronizing signals) fed from the drive circuit 10. Further, a speaker 12 receives an audio signal, to output audio.

The main CPU 18 carries out control of a channel selection command to the terrestrial wave digital tuner 2, an existent station channel search, etc., control of writing/readout of existent station channel information to/from a first memory (EEPROM) 13, control of the demultiplexer 6, control of the AV decoder 7, control of the OSD circuit 15, and a command to a sub-CPU 21, described later, and so forth.

A remote control transmitter 19 is a transmitter for sending out a command to a broadcasting receiver 30 according to the present embodiment. When a key (not shown) provided in the remote control transmitter 19 is operated, signal light (a remote control signal) meaning a command corresponding to the key is sent out from a light emitter (not shown). A remote control light receiver 20 receives the signal light, converts the received signal light into an electric signal, and feeds the electric signal to the sub-CPU 21.

The sub-CPU 21 also performs existent station channel search processing for terrestrial wave analog broadcasting besides performing processing such as processing for receiving the remote control signal by the remote control transmitter 19 or a signal by a key operation in an operation panel (not shown) and notifying the main CPU 18 of the signal. That is, the sub-CPU 21 has in a ROM (not shown) a program for the existent station channel search processing for the terrestrial wave analog broadcasting, and performs the existent station channel search processing for the terrestrial wave analog broadcasting in place of the main CPU 18 when it receives a search command from the main CPU 18. In the channel search, data is fed to the channel selection processing circuit in the terrestrial wave analog tuner 4 such that a tuning voltage is gradually raised, and it is judged whether or not a station exists on a channel depending on whether or not a horizontal synchronizing signal is included at a predetermined ratio or more in a video signal after the detection. When it is judged that a station exists on a channel, the data is stored in the second memory (EEPROM) 22 in correspondence with a channel number.

Thus, the existent station channel search for the terrestrial wave analog broadcasting shall be performed by the sub-CPU 21, and the existent station channel search for the terrestrial wave digital broadcasting shall be performed by the main CPU 18. The contents of the processing are specifically as shown in a flow chart of FIG. 2. When the channel search processing is started, the main CPU 18 issues a channel search start command to the sub-CPU 21 (step 20), the main CPU 18 itself sets the lowest frequency, for example, in the digital tuner 2, and causes the digital tuner 2 to perform a channel selection operation (step S21), judges whether or not a station exists on a channel (step S22), and performs channel information storage processing when it is judged that a station exists on a channel (step S23). It judges whether or not the set channel is a search end channel (frequency) (step S24), and sets the subsequent frequency if the set channel is not a search end channel (step S25), after which the program is returned to the step S21, to repeat a series of processing, described above On the other hand, the sub-CPU 21 which has received the channel search start command sets the lowest frequency, for example, in the analog tuner 4, and causes the analog tuner 4 to perform a channel selection operation (step S26), judges whether or not a station exists on a channel (step S27), and performs channel information storage processing when it is judged that a station exists on a channel (step S28). It judges whether or not the set channel is a search end channel (frequency) (step S29), and sets the subsequent frequency if the set channel is not a search end channel (step S30), after which the program is returned to the step S26, to repeat a series of processing, described above. When it judges that the set channel is a search end channel, the main CPU 18 is notified that the existent station channel search processing for the analog broadcasting is terminated (step S31).

The main CPU 18 terminates, if it receives the notification that the existent station channel search processing for the analog broadcasting is terminated from the sub-CPU 21 at the time point where the existent station channel search processing for the digital broadcasting is terminated, the search processing, and terminates, if it does not receive the notification that the existent station channel search processing for the analog broadcasting is terminated from the sub-CPU 21 at the time point where the existent station channel search processing for the digital broadcasting is terminated, the search processing when it receives the notification.

The existent station channel search processing on the side of the terrestrial wave digital tuner 2 and the existent station channel search processing on the side of the terrestrial wave analog tuner 4 are thus concurrently performed, thereby making it possible to reduce a total time in the existent station channel search processing for the analog broadcasting and the digital broadcasting to approximately one-half that in the conventional example.

In channel selection processing (processing for channel designation by a remote control operation or the like by a user) performed after the existent station channel search processing is terminated, the sub-CPU 21 notifies the main CPU 18 of a remote control input signal (code). The main CPU 18 analysis the code, to cause the digital tuner 2 to perform a channel selection operation (frequency setting) on the basis of the channel information stored in the first memory 13 when the remote control input signal is a signal representing channel designation for digital broadcasting, and to control the demultiplexer 6 in order to take out a packet on a designated channel on the basis of the PSI/SI. On the other hand, the main CPU 18 issues a channel selection command to the sub-CPU 21 when the remote control input signal is a signal representing channel designation for analog broadcasting. The sub-CPU 21 is based on the channel selection command, to cause the analog tuner 4 to perform a channel selection operation (frequency setting) on the basis of the channel information stored in the second memory 22.

Although a configuration in which the first memory 13 storing channel information for digital broadcasting and the second memory 22 storing channel information for analog broadcasting are provided and are respectively controlled by the main CPU 18 and the sub-CPU 21 was illustrated, the present invention is not limited to the same. For example, a configuration in which the sub-CPU 21 feeds channel information obtained in existent station channel search processing to the main CPU 18, and the main CPU 18 manages on one memory all the channel information may be employed.

As described in the foregoing, the present invention produces such an effect that the total time in the existent station channel search processing for the analog broadcasting and the digital broadcasting can be shortened.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a digital and analog broadcasting receiver comprising both a digital tuner for receiving digital broadcasting and an analog tuner for receiving analog broadcasting, a digital and analog broadcasting receiver comprising:
   a first CPU; and
   a second CPU,
   the first CPU being in charge of existent station channel search processing on the side of the digital tuner,
   the second CPU being in charge of existent station channel search processing on the side of the analog tuner,
   a frequency to be received by each tuner being changed independently by each CPU,
   channel searches by the first CPU and the second CPU being concurrently conducted;
   wherein
   when the existent station channel search is started,
   the first CPU instructs the second CPU to start the existent station channel search and performs the existent station channel search processing on the side of the digital tuner, and
   the second CPU performs the existent station channel search processing on the side of the analog tuner upon receipt of the instruction to start the search from the first CPU.

2. The digital and analog broadcasting receiver according to claim 1, wherein
   the second CPU inputs a signal based on a key operation by a user and operates.

3. The digital and analog broadcasting receiver according to claim 1, comprising
   a first memory; and
   a second memory,
   the first CPU controls the writing and read-out of channel information to and from a first memory, and
   the second CPU controls the writing and read-out of channel information to and from a second memory.

4. The digital and analog broadcasting receiver according to claim 2, comprising
   a first memory; and
   a second memory,
   the first CPU controls the writing and read-out of channel information to and from a first memory, and
   the second CPU controls the writing and read-out of channel information to and from a second memory.

5. The digital and analog broadcasting receiver according to claim 1, wherein
   the second CPU feeds the channel information obtained in the existent station channel search processing to the first CPU, and
   the first CPU manages all the channel information on one memory.

6. The digital and analog broadcasting receiver according to claim 2, wherein
   the second CPU feeds the channel information obtained in the existent station channel search processing to the first CPU, and
   the first CPU manages all the channel information on one memory.

* * * * *